United States Patent [19]
Underwood et al.

[11] 3,772,628
[45] Nov. 13, 1973

[54] INTEGRAL SILICON DIAPHRAGMS FOR LOW PRESSURE MEASUREMENTS

[75] Inventors: Joe B. Underwood; Alexander J. Yerman, both of Scotia, N.Y.

[73] Assignee: General Electric Company, Schenectady, N.Y.

[22] Filed: May 30, 1972

[21] Appl. No.: 257,539

[52] U.S. Cl. ............................... 338/4, 73/88.5 SD
[51] Int. Cl. ............................................... G01l 1/22
[58] Field of Search ............................ 338/2, 4, 5; 73/88.5 SD

[56] References Cited
UNITED STATES PATENTS

| | | | |
|---|---|---|---|
| 3,654,579 | 4/1972 | Kurtz et al. | 73/88.5 SD |
| 3,537,319 | 11/1970 | Yerman | 338/4 X |
| 3,410,132 | 11/1968 | Hall | 73/88.5 SD |

*Primary Examiner*—C. L. Albritton
*Attorney*—John F. Ahern et al.

[57] ABSTRACT

A restrained-edge silicon diaphragm has a high area-to-thickness ratio for measuring low fluid pressures and develops both bending and membrane stresses. To obtain a linear output voltage in a circular diaphragm, the active gages in a half-active or fully-active resistance bridge are located at the unique radial position $r/a = 0.54$ at which the strain is substantially linear. Improved linearity in another gage pattern with central and outer gages is obtained by locating the outer gages near the edge.

11 Claims, 8 Drawing Figures

INTEGRAL SILICON DIAPHRAGMS FOR LOW PRESSURE MEASUREMENTS

BACKGROUND OF THE INVENTION

This invention relates to integral silicon transducers for sensing very low pressure differentials, and more particularly to the arrangement of the semi-conductor strain gages on the silicon diaphragm to obtain a more linear output.

Integral silicon transducers utilize a circular, edge-restrained, monocrystalline diaphragm that is sufficiently thin to be deflected in response to an applied fluid pressure. The opposite conductivity type strain gages exhibit a change in resistance when strained and yield a measure of the applied pressure. Desirably the diaphragm has active central and outer strain gages that are respectively subjected to tensile and compressive bending stresses as the diaphragm flexes, thereby producing additive opposite sign resistance changes in a half bridge or full bridge circuit. Except at very low pressures, the diaphragm can be treated analytically as a flat circular plate in which only the bending stresses are significant inasmuch as there are negligible membrane stresses. The strain and output voltage are linear as the pressure changes, to within a few percent, so long as the deflection at the center of the diaphragm is no greater than about one-fifth of its thickness. In order to measure very low pressures, the sensitivity of the diaphragm is increased by making it relatively thin as compared to its radius. At large radius-to-thickness ratios, however, such diaphragms show appreciable deflection so that an analysis based on simple bending results in large errors. For diaphragms suitable for measuring low pressures the membrane stresses as well as the bending stresses must be considered in order to obtain valid analytical results and achieve a reasonably linear transducer.

SUMMARY OF THE INVENTION

An integral silicon pressure transducer for the measurement of low fluid pressure differentials of about 5 psi and less uses a thin silicon diaphragm with a high area-to-thickness ratio. Although applicable to diaphragms with other geometries, the preferred embodiment is a circular integral silicon diaphragm with a radius-to-thickness ratio greater than about 10. In such a thin diaphragm, as has been mentioned, the membrane stresses as well as the bending stresses are appreciable and result in a strain distribution that in general is non-linear as the pressure changes over a predetermined pressure range. At the unique radial position $r/a = 0.54$ in circular diaphragms, however, the strain is substantially linear. In one embodiment of the invention achieving a linear output voltage at low pressures, a pair of diametrically spaced active gages are formed integrally on one side of the diaphragm at the radial position $r/a \approx 0.54$ so as to be subject to tensile strains. A half-active resistance bridge pattern is completed by a pair of non-strain sensitive strain gages and low resistance interconnection areas formed on the same side of the diaphragm. A modification uses two pairs of active strain gages arranged as a fully active resistance bridge, the second pair being located on the other side of the diaphragm at the radial position $r/a \approx 0.54$ so as to be subject to compressive strains. In another embodiment of the invention with improved linearity of output voltage, a known gage pattern is used comprising a pair of central and outer gages formed on one side of the circular diaphragm that are respectively subjected to tensile and compressive strains. In this fully active bridge circuit, a more linear output voltage is obtained at low pressures by locating the outer gages near the edge at the radial position $r/a = 0.90$.

DESCRIPTION OF THE PREFERRED EMBODIMENTS

The preferred forms of the invention utilize a very thin circular integral silicon diaphragm that develops significant bending and membrane stresses in response to sensing low fluid pressures. The technique to be described, however, can be applied to thin diaphragms with geometries other than circular, such as square, rectangular, oval, or polygonal. These non-circular diaphragms in analogous manner have a high area-to-thickness ratio so as to generate membrane stresses as well as bending stresses, and are treated analytically in analogous manner as is known in the science of engineering mechanics.

Figure 1:
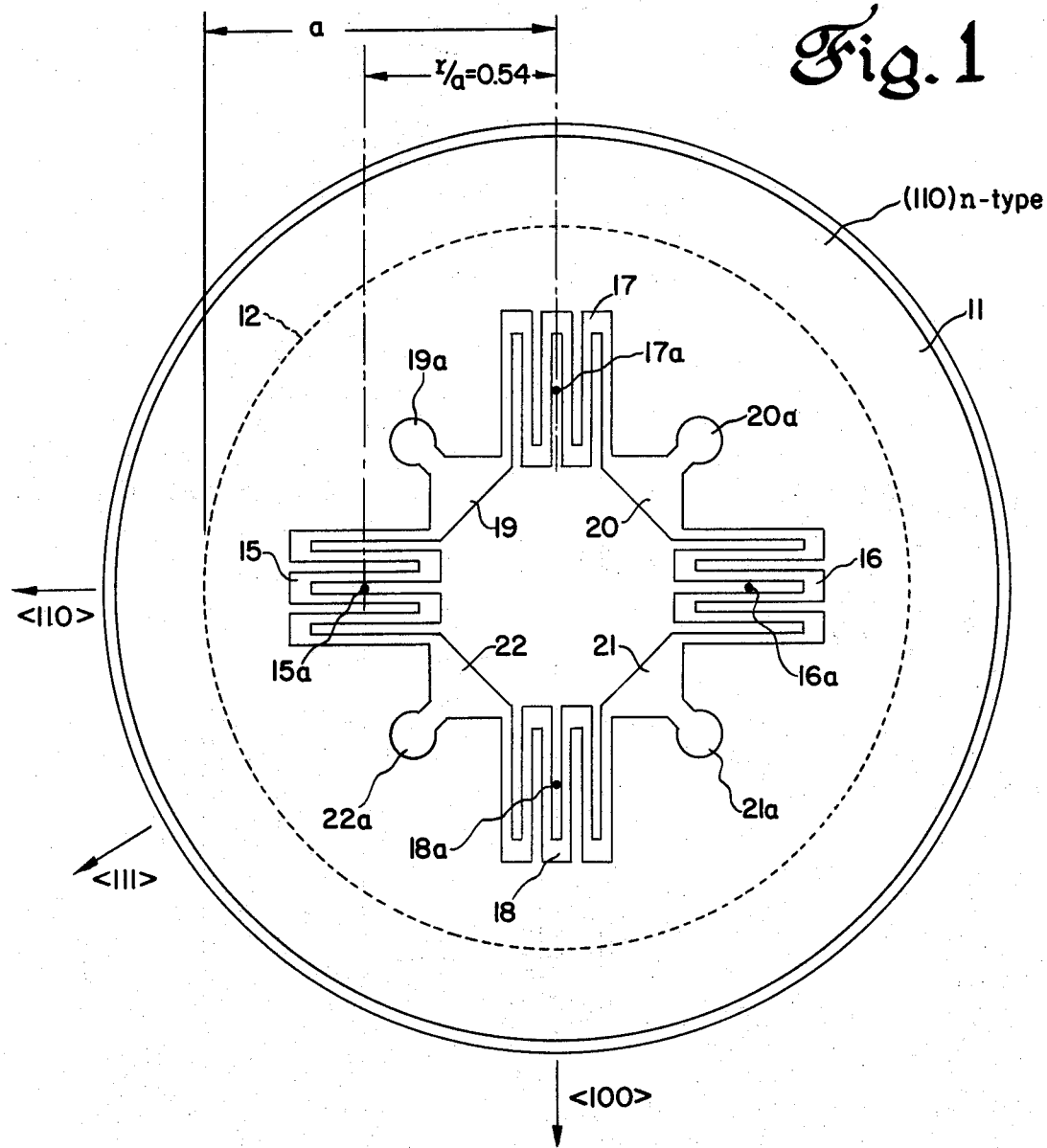
FIG. 1 is a plan view of the integral silicon diaphragm per se showing the individual strain gage elements and other interconnection members in a full bridge pattern with only two active gages located to obtain an approximately linear output voltage.
Figure 2:
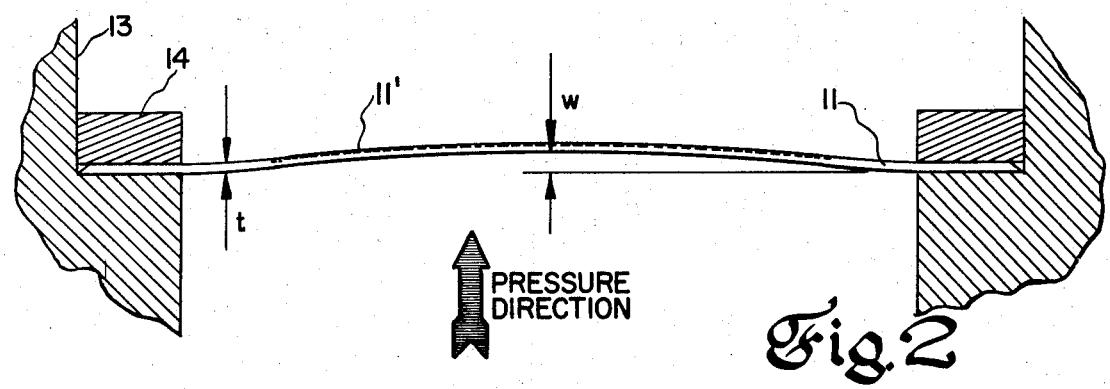
FIG. 2 is a side view of the diaphragm of FIG. 1 mounted rigidly at the edges and subjected to a low pressure differential acting in the direction indicated.

Referring to FIGS. 1 and 2, a stress responsive diaphragm 11 is preferably made from a thin wafer of (110) plane n-type silicon semiconductor material cut from a single crystal of silicon. The monocrystalline silicon diaphragm 11 has a circular shape, and is edge-restrained so that only the portion of the diaphragm within the dashed line 12 flexes in response to a fluid pressure differential. In a typical mounting structure, the edges of the diaphragm 11 are rigidly mounted between the shoulder of a housing 13 and an overlying retaining ring 14. As is indicated by the arrow, pressure transmitted through a fluid within the smaller diameter bore acts approximately axially against the adjacent surface of the diaphragm 11, flexing it outwardly as a function of the magnitude of the pressure. To measure low pressure differentials of approximately 5 lbs/sq. in. and less, the sensitivity of the diaphragm to pressure is increased by selecting the radius a of the active diaphragm and its thickness t such that the ratio $a/t$ is large, at least 10 or more. This is accomplished by making the active diaphragm radius relatively large, by making the diaphragm very thin, or by a combination of the two. Single crystal silicon is advantageous in this respect since a diaphragm can be cut as thin as 5 or 6 microns. From a cost standpoint the active diaphragm diameter of a defect-free sample should be one-quarter inch or less.

A plurality of semiconductor strain gages of opposite conductivity type, in this case p-type silicon, are formed integrally on or in the outer surface of diaphragm 11 as indicated generally at 11′, out of contact with the pressure transmitting fluid if it is electrically conductive. These p-type strain gages are formed on one surface of the n-type substrate 11 by techniques well known in the semiconductor fabrication art. In this first embodiment of the invention there are two active strain gages 15 and 16 and two orthogonally located passive strain gages 17 and 18, the gages in each pair being diametrically spaced. Each individual strain gage comprises at least one elongated strip of p-type silicon, although as illustrated, each gage can comprise several elongated p-type silicon strips folded back parallel to one another accordian fashion in order to increase the length-to-width ratio and hence resistance of a gage located within a given area of diaphragm 11. The four centers of the elongated strips making up each respective strain gage, or of the group of strips reverse folded back upon one another, are designated by the numerals 15a–18a.

In accordance with the invention, the two active gages 15 and 16 are located at radial positions on the diaphragm selected to obtain a substantially linear output voltage when measuring very low pressures. The greatest degree of linearity is obtained for the radial position $r/a = 0.54$, where r is the radial distance from the center of the diaphragm to the center of the gage, and a is the radius of the active diaphragm. The reason for selecting this radial position is discussed later with regard to FIG. 7. Outer gages 15 and 16 are further preferably oriented in the <110> crystallographic direction. For a (110) plane n-type substrate, this orientation is most desirable since the sensitivity of p-type silicon semiconductor material to radial or longitudinal strain is high while its sensitivity to tangential or transverse strain is relatively low. Thus, tangential strains applied to active gages 15 and 16 reduces their individual outputs only negligibly. An alternative location for active gages 15 and 16 is the <111> direction. Passive gages 17 and 18, on the other hand, are preferably oriented in the <100> crystallographic direction to provide a low or minimum sensitivity to strain. Although the radial position of the passive gages is not critical, they are also desirably located with $r/a = 0.54$ or less to provide a symmetrical "square" gage pattern in which all of the gages are subjected to substantially the same strain distribution. It will be understood, however, that the principles of the invention are applicable generally to strain gages oriented in other crystallographic directions than the foregoing.

The p-type silicon pattern on the surface of diaphragm 11 further includes four relatively low resistance connection areas 19–22 for connecting strain gages 15–18 as a full bridge circuit. Each of these low resistance connection areas is in turn connected by a small neck to a contact pad respectively indicated at 19a–22a. With this arrangement, it is seen that the four strain gages are connected in a Wheatstone bridge configuration, and the unbalance output voltage $e_o$ is sensed between two opposite contact pads, such as 20a and 22a, while the energizing voltage is supplied between the opposing pair of contact pads, in this case, contact pads 19a and 21a. The current flow through the circuit elements represented by the p-type silicon pattern formed integrally on the surface of the n-type substrate 11 is constrained to the p-type elements because of the existence of a p-n rectifying barrier between the opposite conductivity pattern and substrate.

Figures 3, 5:
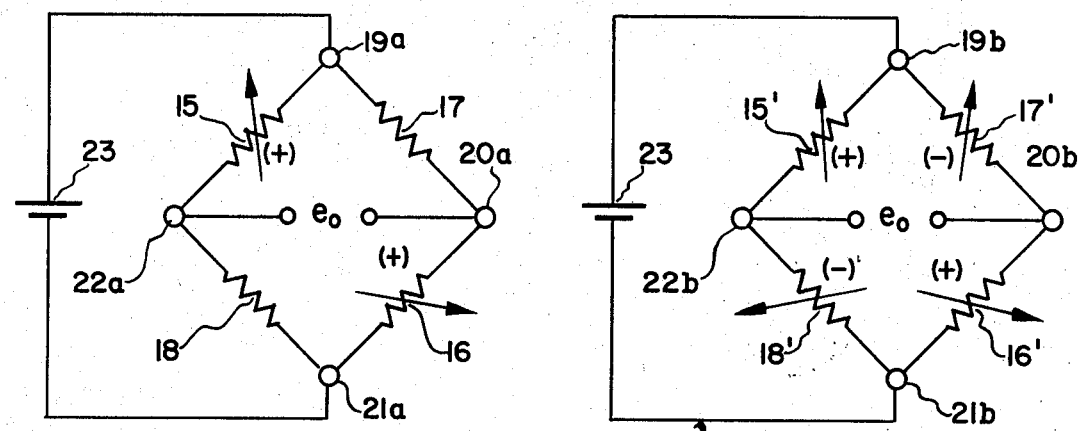
FIG. 3 is a simplified schematic circuit diagram of the equivalent resistances for the two active and two passive strain gages of FIG. 1 connected in a Wheatstone bridge arrangement.
FIG. 5 is a resistance bridge circuit diagram for the strain gage arrangement illustrated in FIG. 4.

In the half-active resistance bridge circuit shown in FIG. 3, the resistance of active strain gages 15 and 16 changes as a function of the applied stress or strain, and the equivalent circuit representation is therefore a variable resistor. Passive strain gages 17 and 18, on the other hand, are relatively strain insensitive and are represented as substantially fixed resistors. The source of energy for this circuit is the battery 23. The sign of the strain-induced resistance change of active gages 15 and 16, which in turn is the function of the pressure exerted on diaphragm 11, is indicated in parenthesis following the numerical designation of each gage element. Both of the active gages 15 and 16 are located in the central portion of the diaphragm and are subjected to tensile strains. FIG. 2 shows to an exaggerated scale the flexing of a thin diaphragm 11 exposed to a fluid pressure differential, and it is observed that all portions of the p-type silicon pattern 11′ or substantially all portions of the pattern are loaded in tension.

Figure 4:
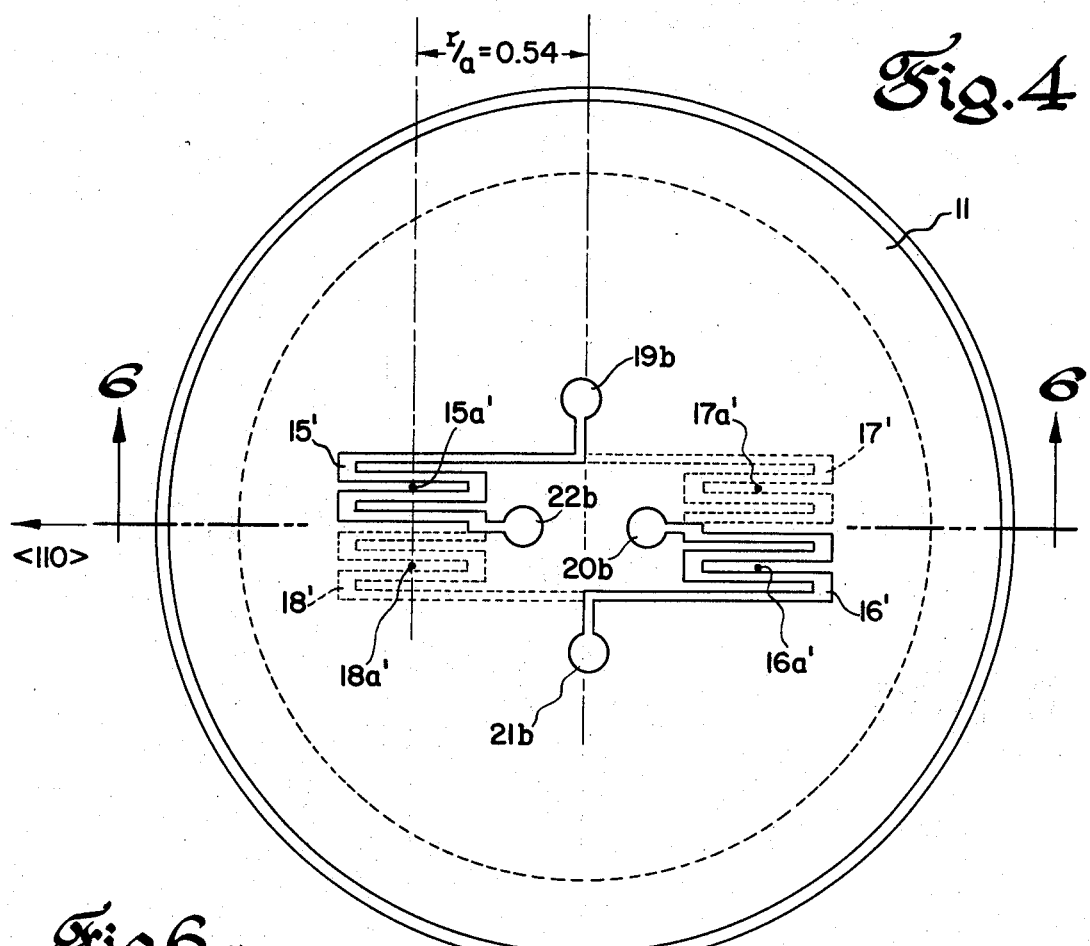
FIG. 4 shows a modification of the integral silicon diaphragm of FIG. 1 using four active strain gages, two on each side of the diaphragm.

FIG. 4 illustrates a modification of the strain gage arrangement of FIG. 1 which utilizes four active strain gages 15′–18′, two formed integrally on one surface of diaphragm 11 so as to be loaded in tension, while the other two are formed integrally on the opposite surface and are loaded in compression. All four strain gages are preferably oriented in the same crystallographic direction, with their centers 15a′–18a′ located at the radial position $r/a = 0.54$ to obtain a linear output voltage when measuring low pressures. As illustrated, gages 15′ and 16′ are formed on the top surface of diaphragm 11, respectively offset in opposite directions from a common diameter, and gages 17′ and 18′ drawn in dashed lines are formed on the bottom surface of diaphragm 11 in similar offset positions from the common diameter to form a symmetrical pattern. Contact pads 19b–22b in this case have the dual function of being through-connections serving to connect the gages on one side of the diaphragm with the gages on the other side. Referring to FIG. 5, gages 15′–18′ in the resistance bridge circuit are all active gages and are accordingly represented by variable resistors. As compared to FIG. 3, gages 17′ and 18′ are subjected to compressive strains and now contribute to the unbalance output voltage $e_o$. By locating each of the gages at the same radial position, each pair of series-connected gages are subject to equal but oppositely signed strains. There is consequently an increase in output by a factor of two. As between FIGS. 1 and 4, the strain gage arrangement of FIG. 4 is preferred because of the greater sensitivity and superior linearity but has the disadvantage that two of the gages are in direct contact with the pressure transmitting fluid which therefore must be electrically nonconducting.

Figure 6:
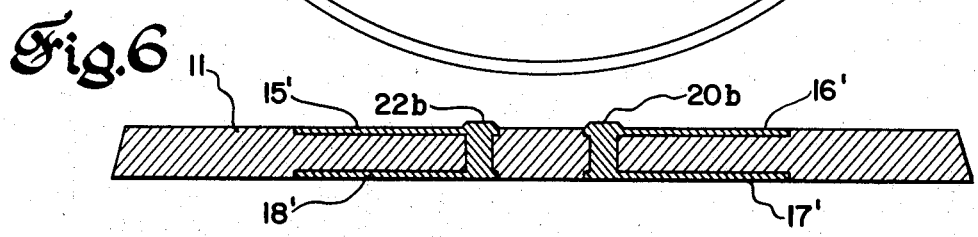
FIG. 6 is a cross-sectional view of the integral silicon diaphragm of FIG. 4 showing a preferred through-connection technique.

Since silicon diaphragms for measuring low pressure differentials are invariably very thin, the through-connections 19b–22b between gages on the opposite sides can be fabricated by a suitable diffusion process. Referring to FIG. 6, the through-connections are accomplished by a diffusion of gold, aluminum, boron, or other appropriate material for thin silicon substrates. The contact pads for connection of external leads overlie the diffused through-connections.

Figure 7:
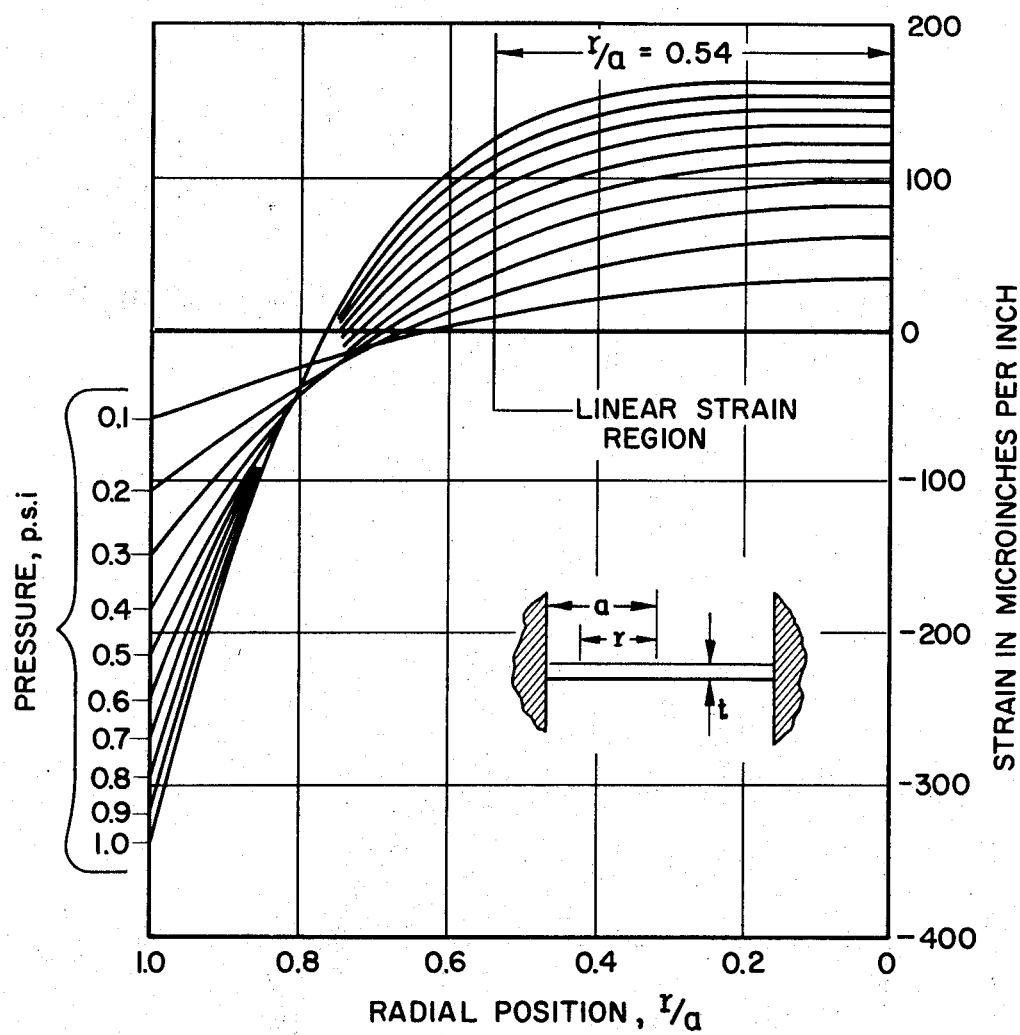
FIG. 7 shows a family of radial strain characteristics for silicon diaphragms for the pressure range of 0.1 to 1 psi, each characteristic illustrating the strain with respect to the radial position of an individual strain gage as indicated by the ratio $r/a$, where a is the radius of the active diaphragm.

The reason for the location of the active strain gages at the radial position $r/a = 0.54$ is evident from a study of FIG. 7. FIG. 7 shows a family of curves of the radial strain in microinches/inch applied to a strain gage mounted on a circular diaphragm at a radial position $r/a$. The strain above the zero ordinate is tensile (the ordinate is positive) while that below zero is compressive (the ordinate is negative). The curves for the pressure range of 0.1 psi to 1.0 psi, in 0.1 psi increments, are given. At $r/a = 0.54$ the change in strain level is approximately constant as the applied pressure is changed by equal increments from one end of the range to the other. That is, the strain variation is relatively linear within about 3 percent of the full scale pressure. By comparison, the strain variation at the center of the diaphragm ($r/a = 0$) is highly non-linear since the increase in strain level decreases as the applied pressure is varied by equal increments from 0.1 psi to 1.0 psi. The maximum degree of non-linearity occurs at $r/a = 0.82$ due to the fact that the strain is substantially constant at pressures above 0.3 psi. There is furthermore no relatively linear region for negative or compressive strains so that a fully active linear bridge with four strain gages on only one side of the diaphragm 11, two subjected to tensile strains and two subjected to compressive strains, is not possible. The two possible strain gage arrangements utilizing only the radial position $r/a = 0.54$ in order to have a linear strain variation with pressure are illustrated in FIGS. 1 and 4. As has been mentioned, the fully active bridge shown in FIG. 4 is preferred, but requires the use of both sides of the diaphragm. The half-active bridge of FIG. 1 produces an output signal that is about 60 percent of the value for the "in-line" gage pattern shown in FIG. 8 with a terminal non-linearity of about 3 percent of full scale. Of course, placement of the active gage centers slightly to either side of the exact position $r/a = 0.54$ produces only a small increase in non-linearity and is within the scope of the invention.

Figure 8:
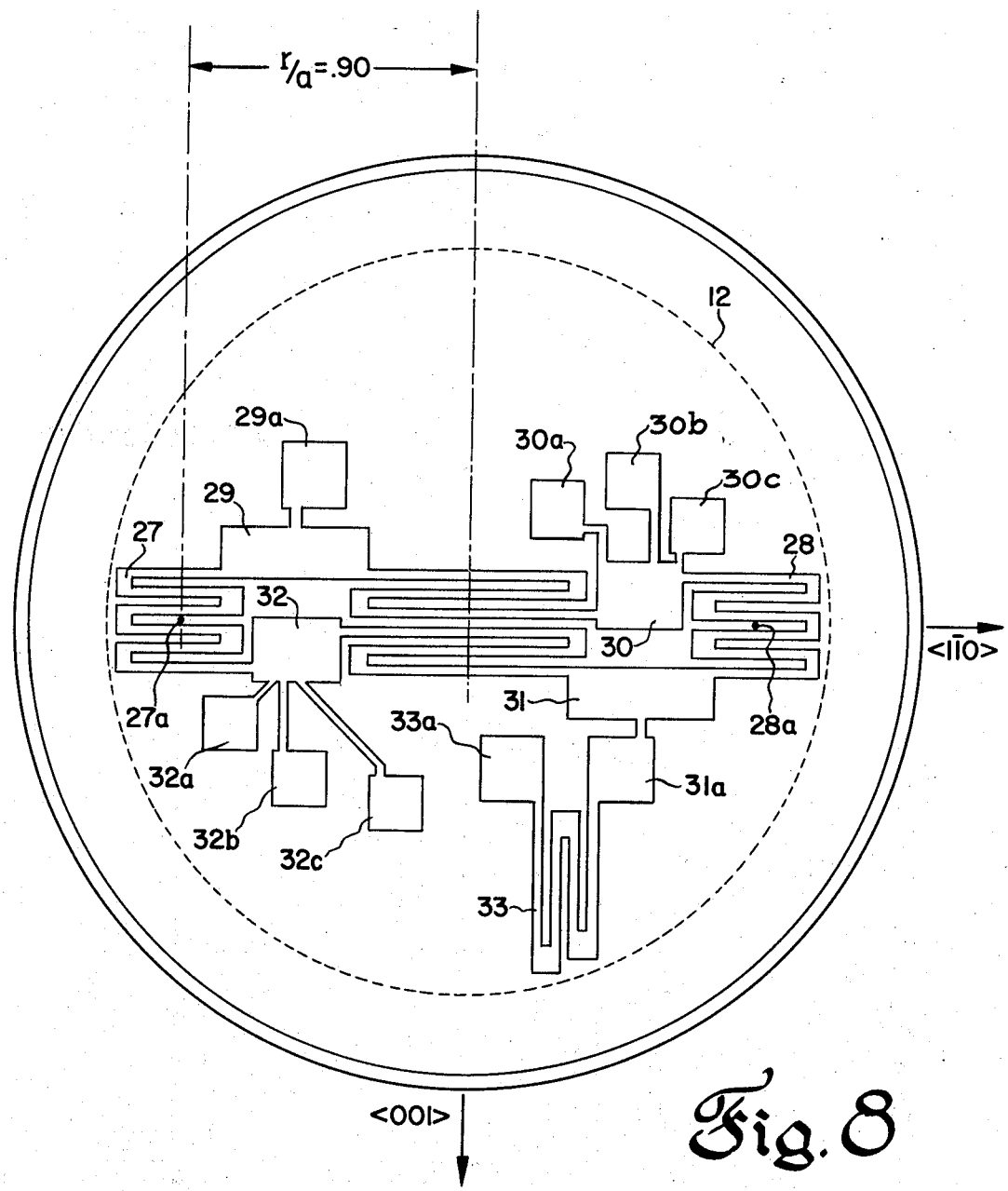
FIG. 8 is a plan view of an integral silicon diaphragm according to another embodiment of the invention using four active strain gages in an "in-line" pattern.

The integral silicon diaphragm with the "in-line" strain gage pattern shown in FIG. 8 is one arrangement that can be used when it is desired to have a fully active bridge with four active strain gages on only one side of the diaphragm. With the gages located at the preferred radial positions to be described, this embodiment exhibits a higher degree of non-linearity than in the previous embodiments but is adequate for some applications. The p-type silicon pattern includes a pair of central strain gages 25 and 26 located at or adjacent the center of the active diaphragm to be loaded in tension, and two outer strain gages 27 and 28 located toward the outer edges of the active diaphragm so as to be loaded in compression. All four active strain gages are formed in a symmetrical pattern with respect to a chosen diameter and are preferably oriented in the $<1\bar{1}0>$ crystallographic direction. In this direction the sensitivity of the p-type silicon semiconductor material to tangential strains is zero or relatively low, while its sensitivity to radial strain is relatively high. Exposure of central gages 25 and 26 to approximately equal amplitudes of tangential and radial strains as it occurs near the diaphragm center consequently reduces sensitivity only a negligible amount. The respective centers 27a and 28a of outer gages 27 and 28 are preferably located at the radial position $r/a = 0.90$ to obtain improved linearity of output voltage. The four strain gages 25–28 are connected in a full bridge circuit by means of four relatively low resistance connection areas 29–32. The two opposite low resistance connections 29 and 31 are further respectively connected by a small neck to the contact pads 29a and 31a. A single resistance element 33 connected between contact pads 31a and 33a is located toward the edge of the active diaphragm and oriented in the $<001>$ crystallographic direction. In this direction the element is non-strain sensitive and its function is to provide optional series resistance for temperature compensation purposes. A battery or other source of energy is connected between contact pads 29a and 31a, or between contact pads 29a and 33a if resistance element 23 is used. To facilitate the sensing of the unbalance output of voltage $e_o$ between the opposite junctures of the bridge circuit, three separate contact pads 30a–30c are connected to low resistance connection 30, and in similar fashion three contact pads 32a–32c are associated with low resistance connection 32. The unbalance output voltage is sensed between any one of the three pairs of contact pads, with a choice being provided to obtain a closer balance of the bridge under zero pressure conditions.

In a full bridge Wheatstone type measuring circuit similar to that shown in FIG. 5, central gages 25 and 26 have opposite sign resistance changes as compared to outer gages 27 and 28, with an output voltage of approximately double that obtained by using a half-active bridge arrangement. For further information on an integral silicon diaphragm of this type, the reader is referred to the U.S. Pat. No. 3,537,319, granted Nov. 3, 1970 to A. J. Yerman, and assigned to the same assignee. In this patent the outer gages are skewed with respect to the central gages for optimum sensitivity and their centers are located at the radial position $r/a = 0.82$. The gage pattern shown in FIG. 8 is obtained by rotating the outer gages into alignment with the central gages with the advantages that the over-all bridge circuit does not respond to a mismatch in temperature coefficient of diaphragm 11 and mounting structure 12. Location of outer gages 27 and 28 at the radial position $r/a = 0.82$ in a very thin diaphragm for measuring low pressure differentials is not as suitable, however, because the strain variation at this gage location is highly non-linear as previously discussed with regard to FIG. 7. With the central gages at an average position of $r/a = 0.15$ and the outer gages at $r/a = 0.82$, the contribution of the outer gages progressively diminishes as the pressure exceeds 0.3 psi. Improved linearity is obtained by moving outer gages 27 and 28 closer to the edge of the diaphragm. To allow space for the entire length of outer gages 27 and 28 on the active diaphragm, the respective centers 27a and 28a have the preferred radial location of $r/a = 0.90$ to provide an improvement in output signal level as well as linearity. As to the "in-line" pattern, also see U.S. Pat. No. 3,697,918, granted Oct. 10, 1972 to E. D. Orth and A. J. Yerman, and assigned to the same assignee.

Having described the integral silicon diaphragm configurations characterized by improved linearity of strain and output voltage at low pressure differentials, the theoretical basis of the invention will be discussed briefly. As has been stated, silicon diaphragms for measuring pressures lower than about 5 psi have a radius-to-thickness ratio ($a/t$ ratio) greater than 10. In such diaphragms, the deflection $w$ at the center of the diaphragm (see FIG. 2) is sufficiently large that the membrane stresses are no longer negligible and must be considered in order to calculate composite stresses and strains to obtain curves such as those in FIG. 7. By way of background, it is pointed out that the science of engineering mechanics recognizes a difference in analytical approach between a plate and shell. In a thin plate, such as an integral silicon diaphragm with a small $a/t$ ratio less than 10, only the bending stresses are significant and membrane stresses are negligible. A thin shell, on the other hand, has a curved surface such that only the membrane stresses are significant and bending stresses are negligible. It can be stated in general that membrane stresses in thin circular plates, clamped at the edge and with uniform lateral loading, can be ignored so long as the deflection $w$ does not exceed one-fifth of the diaphragm thickness $t$. The strain is linear with applied pressure to within a few percent. Beyond that point, both deflection and bending stresses become increasingly nonlinear as more of the load is supported by membrane stresses generated in the diaphragm. For the very thin diaphragms used here to measure low pressures, the deflection $w$ is up to 1.5 times the thickness, and the $a/t$ ratio is as high as 160. By way of example, an integral silicon pressure transducer for the range 0.1 to 1.0 psi has a radius of 125 mils and a thickness of 0.8 mils, or any alternative size such as 40 mils and 0.26 mils with the same $a/t$ ratio. For a maximum pressure range of 3 psi, a diaphragm with $a = 40$ mils and $t = 0.46$ mils is suitable.

For an edge-restrained plane diaphragm as shown in FIG. 8 with a full bridge comprising four integral strain gages including two inner gages and two outer gages, the electrical output from the bridge is $$e_o/V = \tfrac{1}{2}\,(\Delta R_i/R_i - \Delta R_o/R_o), \tag{1}$$

where $\Delta R_i$ and $\Delta R_o$ are the resistance changes due to strain of the inner and outer gages, respectively, and $V$ is the voltage applied to the bridge. Since the gage factor of a gage is defined as the resistance change per unit of strain, i.e., G.F. = $\Delta R/R\epsilon$, for the case where all strain gages have the same gage factor, this gives $$e_o/V = G.F./2\;(\epsilon_i - \epsilon_o), \tag{2}$$

where $\epsilon_i$ and $\epsilon_o$ are the strains applied to the inner and outer gages at some specific applied pressure value. Equation (2) is generally valid for linear and non-linear diaphragms, and can be used to calculate the output voltage for the very thin diaphragms here described. Where there are only two active gages on one side of the diaphragm as in FIG. 1, the term $\epsilon_o$ is dropped.

The radial and tangential stresses at a gage position are designated as $\sigma_r$ and $\sigma_T$. The total stress in each direction is the sum of the bending stress, $\sigma_r''$ or $\sigma_T''$, and the membrane stress $\sigma_r'$ or $\sigma_T'$, which vary with applied pressure. Thus $$\sigma_r = \sigma_r'' + \sigma_r', \text{ and} \tag{3}$$

$$\sigma_T = \sigma_T'' + \sigma_T'. \tag{4}$$

The strain at any radial position is then:

$$\epsilon_r = (\sigma_r'' + \sigma_r')/E - \nu(\sigma_T'' + \sigma_T')/E, \tag{5}$$

where $\nu$ is Poisson's ratio and $E$ is Young's modulus. With the availability of these stresses as a function of radial position and pressure, the solution of equation (2) is possible as a function of the applied pressure.

As is known in the art, the bending stresses depend on such factors as the pressure $p$, the active diaphragm radius $a$, the radial position of the gage $r$, the diaphragm thickness $t$, and Poisson's ratio $\nu$. Similarly, the membrane stresses depend on such factors as Young's modulus $E$, Poisson's ratio $\nu$, and the radial displacement of points in the middle surface with respect to their undeflected positions. The present work is considered to be an extension of the technique given in the publication "Bending of Circular Plates with Large Deflection" by S. Way, Transactions of the ASME, 56, 627–636 (1934), to which the reader may refer for further information. This article does not, however, mention a specific application to strain gages. The technique reported therein is extended to higher deflection-thickness ratios, and bending and membrane stresses and strain are computed as a function of the radial position $r/a$ so that the effect of the position of the integral strain gages can be evaluated. For the specific case in FIG. 7, i.e., the $<110>$ direction in silicon, $a/t = 156.25$, $\nu = 0.36$, and $E = 24.51 \times 10^6$ psi. The calculated results are shown in FIG. 7. It can also be demonstrated that the non-linearity of strain and output voltage varies as the factor $(a/t)^4$. That is, the non-linearity is increasingly significant as the $a/t$ ratio becomes larger.

In summary, linearity of strain and output voltage is achieved in very thin integral silicon diaphragms for the measurement of low values of differential pressure by proper placement of the strain gages on the diaphragm. In determining these gage positions, the influence of membrane stresses as well as bending stresses must be considered. The technique is also applicable to edge-restrained diaphragms with geometries other than circular.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters of the United States is:

1. An integral silicon transducer for measuring a predetermined range of low pressures comprising a restrained-edge silicon diaphragm that has preselected geometry and a high area-to-thickness ratio so as to develop both bending stresses and significant membrane stresses in response to low applied pressures less than 5 psi, a plurality of silicon strain gages formed integrally on said diaphragm including a pair of active gages located at approximate coordinate positions at which the strain is substantially linear as the pressure changes within the predetermined range of low pressures, and circuit means for connecting said pair of active gages in a resistance measuring circuit having a substantially linear output voltage.

2. An integral silicon transducer for measuring a predetermined range of low pressures comprising a circular, restrained-edge silicon diaphragm that has a preselected radius and a high radius-to-thickness ratio greater than 10 so as to develop both bending stresses and significant membrane stresses in response to low applied pressures less than 5 psi, a plurality of silicon strain gages formed integrally on said diaphragm including a first pair of active gages located at the approximate diametrically spaced radial positions at which the strain is substantially linear as the pressure changes within the predetermined range of low pressures, and circuit means for connecting said first pair of gages in a resistance measuring circuit having a substantially linear output voltage.

3. An integral silicon transducer for measuring a predetermined range of low pressures comprising a circular, restrained-edge silicon diaphragm that has a preselected radius and a high radius-to-thickness ratio so as to develop both bending and membrane stresses in response to low applied pressures, a plurality of silicon strain gages formed integrally on said diaphragm including at least a first pair of active gages located at the approximate radial position at which the strain is substantially linear as the pressure changes within the predetermined range of low pressures, and circuit means for connecting said first pair of gages in a resistance measuring circuit having a substantially linear output voltage, in which said radial position is approximately $r/a = 0.54$, where $r$ is the radial distance from the center of the diaphragm to the center of the active gage, and $a$ is the preselected diaphragm radius.

4. A pressure transducer according to claim 3 in which said first pair of active gages are on one side of said diaphragm aligned in the same crystallographic direction and are subjected to tensile strains.

5. A pressure transducer according to claim 4 further including a second pair of passive gages on the same side of said diaphragm aligned in a relatively non-strain sensitive crystallographic direction, said circuit means connecting said first and second pair of gages in a half-active full bridge circuit.

6. A pressure transducer according to claim 4 further including a second pair of active gages formed integrally on the other side of said diaphragm aligned in the same crystallographic direction and subjected to compressive strains, said circuit means connecting said first and second pair of gages in a fully active full bridge circuit.

7. An integral silicon transducer for measuring a predetermined range of low pressures comprising a circular, restrained-edge, n-type single crystal silicon diaphragm that has a preselected radius and a high radius-to-thickness ratio so as to develop both bending and membrane stresses in response to low applied pressures, a p-type silicon pattern formed integrally on said diaphragm including at least a first pair of diametrically spaced active strain gages subjected to tensile strain located at the approximate radial position $r/a = 0.54$ at which the strain is substantially linear as the pressure changes within the predetermined range of low pressures, where $r$ is the radial distance from the center of the active diaphragm to the center of the active gage, and $a$ is the preselected diaphragm radius, said p-type silicon pattern further including a second pair of strain gages and connection means for connecting said first and second pair of strain gages as a full resistance bridge circuit.

8. A pressure transducer according to claim 7 in which said second pair of strain gages are diametrically spaced relatively non-strain sensitive strain gages located on the same side of said diaphragm as said first pair of active strain gages, and said connection means are provided by low resistance areas and contact pads interconnecting said first and second pairs of strain gages.

9. A pressure transducer according to claim 8 in which said first pair of active strain gages are oriented in the <110> crystallographic direction and said second pair of non-strain sensitive strain gages are oriented in the <100> crystallographic direction on a (110) plane n-type silicon diaphragm.

10. A pressure transducer according to claim 7 in which said second pair of strain gages are diametrically spaced active strain gages located on the other side of said diaphragm at the radial position $r/a = 0.54$ so as to be subjected to compressive strains, and said connection means are provided by through-connections interconnecting said first and second pairs of strain gages.

11. A pressure transducer according to claim 8 in which said first and second pair of strain gages are both oriented in the <110> crystallographic direction on a (110) plane n-type silicon diaphragm.

* * * * *